United States Patent [19]

Dandliker et al.

[11] 3,895,872

[45] July 22, 1975

[54] OPTICAL SPEED-MEASURING DEVICES AND METHODS FOR MAXIMIZING THEIR ACCURACIES

[75] Inventors: Rene Dandliker; Paul Iten, both of Oberrohrdorf; Baldur Eliasson, Birmensdorf, all of Switzerland

[73] Assignee: Brown, Boveri & Company Ltd., Switzerland

[22] Filed: Jan. 29, 1973

[21] Appl. No.: 327,694

[30] Foreign Application Priority Data
Jan. 31, 1972 Switzerland .................... 1316/72

[52] U.S. Cl. .................................. 356/28; 350/255
[51] Int. Cl. ........................................... G01p 3/36
[58] Field of Search ............... 356/28; 350/46, 255; 219/121 L

[56] References Cited
UNITED STATES PATENTS

| | | | |
|---|---|---|---|
| 3,419,321 | 12/1968 | Barber et al. | 350/46 |
| 3,548,655 | 12/1970 | Rudd | 356/28 |
| 3,723,004 | 3/1973 | Brayton | 356/28 |

FOREIGN PATENTS OR APPLICATIONS
1,242,063    8/1971    United Kingdom................. 356/28

OTHER PUBLICATIONS
Brayton et al., Proc. 16th Intnl. Aerospace Instr. Symposium, 5–1970, pp. 14–26.
Foreman, Jr. et al., Proc. IEEE, 3–1966, pp. 424–425.

*Primary Examiner*—Maynard R. Wilbur
*Assistant Examiner*—S. C. Buczinski
*Attorney, Agent, or Firm*—Toren, McGeady and Stanger

[57] ABSTRACT

The speed of a moving volume is measured by directing a laser beam onto the volume and forming a Doppler signal in response to the light scattered or reflected by the moving volume as a measure of the speed of the moving volume. The measuring accuracy is maximized by locating the position of the laser beam's minimum spot radius at the center of the volume being measured. The speed at a particular surface may also be measured. In that case, the position of the minimum spot radius is located so as to coincide with the surface.

24 Claims, 5 Drawing Figures

OPTICAL SPEED-MEASURING DEVICES AND METHODS FOR MAXIMIZING THEIR ACCURACIES

BACKGROUND OF THE INVENTION

This invention relates to optical measurement of the speeds of moving volumes and particularly to methods for maximizing the accuracy of such measurement. The invention has particular reference to optical anemometers, which are also called laser Doppler probes, wherein a measured volume is illuminated by at least one light beam from a laser light source, and to methods for eliminating systematic measuring errors in such optical anemometers.

Optical anemometers, or laser Doppler probes, are discussed in the publication "Laser and angewandte Strahlentechnik" No. 3, pp.15 ff., 1971. Such devices perform their measuring function by directing a laser beam onto the volume to be measured and forming a Doppler signal in response to the light scattered or reflected by the volume. The Doppler signal represents a measure of the speed of the volume.

Such anemometers frequently produce measurement errors up to 5 percent. Such high measurement errors are acceptable in some apaplications. However, in other applications, such as the determination of the workpiece speed in steel works, such errors are unacceptable; rather accuracies greater than 0.5 percent are required. In the past the various measurement errors were attributed mainly to imperfections in the devices which processed the measured value or to the usually very low signal-to-noise ratio of the signal which emerges from the photo-detector used in such laser Doppler probes.

An object of this invention is to improve such optical speed measuring devices.

Another object of the invention is to eliminate the beforementioned problems. Specifically an object of this invention is to elimate measurement errors in laser Doppler probes.

SUMMARY OF THE INVENTION

According to a feature of the invention, these objects are attained, in whole or in part, by bringing the position of the minimum spot radius of the laser light illuminating the measured volume into coincidence with the center of the measured volume.

The invention is based upon the recognition that a measurement error in an optical anemometer arises from the manner in which the illuminating beam is produced. When a laser produces a laser beam in the usual $TEM_{oo}$ mode, the caustic or envelope of the radiation profile of the laser light beam is a rotational hyperboloid. In that case, the resonator geometry of the laser beam determines the aperture angle of the asymptotes, the minimum spot radius, and the position of the minimum spot radius. As pointed out in the publication "Laser und angewandt Strahlentechnik No. 1", pp.55 and 56, 1970, the projection of Gaussian modes by spherical lenses or mirrors produces Gaussian modes but with an altered minimum spot radius at a different position. Little or no significance has heretofore been attributed to this characteristic of optical anemometers.

By virtue of the invention, the incident laser light has plane wave fronts in the area of the measured volume. Thus, the dependence of the frequency of the Doppler signal on the position vanishes almost completely in this area. Small displacements of the measured object, such as the material to be rolled, within the focusing volume causes no frequency variation of the Doppler signal.

These and other features of the invention are pointed out in the claims. Other objects and advantages of the invention will become evident from the following detailed description when read in light of the accompanying drawings.

DETAILED DESCRIPTION OF PREFERRED EMBODIMENTS

Figure 1:
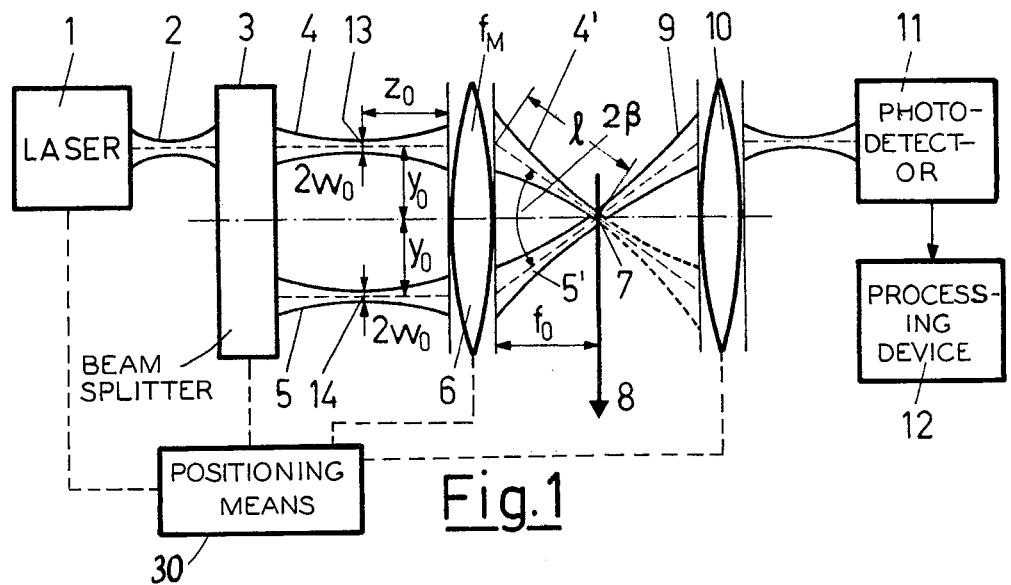
FIG. 1 is a schematic representation of an optical anemometer using an illuminating system for transmission of a beam through the volume being measured.

In FIG. 1, a laser light source, such as a HeNe laser 1, produces a light beam 2. A beam splitter 3 of the plane-parallel plate type or Koester prism type, divides the beam 2 into two beams 4 and 5. A lens 6 focuses these two beams on a volume 7 to be measured. In FIG. 1 the respective beams 4 and 5, after they are focused by the lens 6 are identified as 4' and 5'. At the volume 7 the beams interact with the scattering particles of a flow field indicates by the arrow 8.

A combination beam 9 composed of a reference beam and scatter beam is masked out of the resulting scatter field. A lens 10 focuses the beam 9 on a photo-detector 11. The latter may be in the form of a photo multiplier. A measuredvalue processing device responds to the output of the photodetector 11. The device 12 responds to the photo-detector output signal (Doppler signal) to produce a signal corresponding to the speed of the scattering particles. The devices 12 are disclosed in the beforementioned publication Laser und angewandte Strahlentechnik No. 3, pp.15 ff., 1971.

The locations 13 and 14 of each minimum spot radius $w_o$ of the beams 4 and 5 striking the lens 6 are a distance $z_o$ from the lens 6. The beams 4 and 5 strike the lens 6 at a distance $Y_o$ from the optical axis thereof. The lens 6 has a focal length $f_o$. The meridional or effective focal length of the beams 4 and 5 is designated by $f_m$. The beams 4' and 5' travel a distance $l$ from the lens 6 to the center of the volume 7 being measured.

In FIG. 1, if $z_o$ is made approximately equal to the effective focal length $f_M$ of the lens 6, the locations of the minimum spot radii of the beams 4' and 5' coincide with the center of the measured volume 7. Such concidence of the locations of the minimum spot radii with the center of the measured volume may be accomplished in one of several ways.

According to one embodiment of the invention, the distance of laser 1 from the lens 6 that focuses on the measured volume is adjusted until the condition of coincidence is fulfilled. Thus, the result is achieved by varying the real distance between laser and lens.

According to another embodiment of the invention, the virtual distance between the laser light source 1 and the lens is varied. In this way the location of each minimum spot radius of the laser light falling on the measured volume can be brought into coincidence with the center of the measured volume 7.

According to another embodiment of the invention, the angle between the optical axis of lens 6 and the beams 4 and 5 striking the lens is varied. Thus, the distances travelled by the beams 4' and 5' to the center of the measured volume change.

The optimum distance $z_o$ may be determined exactly, mathematically and experimentally. Using the notations of FIG. 1 for $z_o$, the following equation applies.

$$l = f_M + \frac{f_M^2 (z_o - f_M)}{(z_o - f_M)^2 + (\pi w_o^2/\lambda)^2} \quad (I)$$

Here $\lambda$ represents the wavelength of the laser light. This equation is taken from the book "Laser", published by the Spring Publishing Company, in Berlin in 1969, page 73.

With thin lenses $l = f_M$. Under these circumstances, the second summand in the above equation (1), disappears, so that $$z_o = f_M.$$

Equation I applies strictly only when half the aperture angle of the beams 4' and 5' is very small, that is when $$\cos \beta \cong 1$$

For greater angles of $\beta$, $l / \cos^2 \beta$ must replace $l$ in Equation (1). In ordinary laser light sources, the minimum spot radius is normally positioned at the point where the beam emerges. The wavelengths and the minimum spot radius are available in the data sheet of the laser manufacturer. In this manner, the optimum distance can be determined mathematically. The real variation of the distance $z_o$ can be easily achieved under these conditions by adjusting the distance between the laser and the lens 6.

Figure 3:
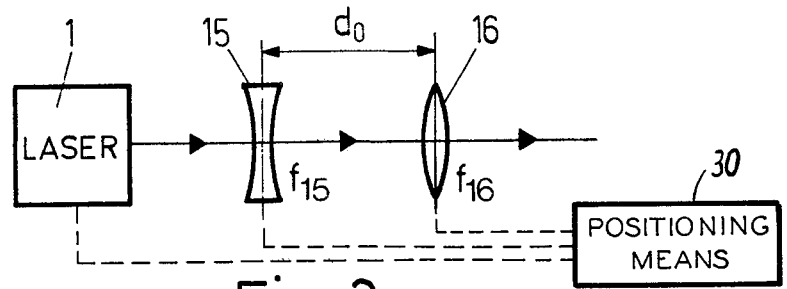
FIG. 3 is a schematic representation of an optical system suitable for practicing a method embodying the invention.

FIG. 3 illustrates a system for virtual displacement of the position of the minimum spot radius. This involves the use of a concave lens 15 and a convex lens 16. By varying the distance $d_o$ between the two lenses 15 and 16 the position of the minimum spot radius can be shifted almost at will. In a practical example of the structure in FIG. 3, using a HeNe laser, a concave lens having a focal length $f_{15} = -70$mm, a convex lens having a focal length $f_{16} = 140$ mm, and distance $d_o = 70$ mm, it was possible to shift the location of the minimum spot radius by more than 2000 mm by varying the distance $d_o$ by ±10mm. It was even possible to shift (virtually) the location of the minimum spot radius into the laser or to the side of the laser away from the point at which the light emerges.

The arrangement of FIG. 3, of course, changes the magnitude of the minimum spot radius $w_o$. The typical value of $w_o$ is 0.3mm for HeNe lasers. In the before-mentioned example, the minimum spot radius $w_o$ was 0.6 mm, but it varied insignificantly as a function of its location.

The optimum distance $z_o$ is determined experimentally, by placing a constant velocity reference flow, having a minimal fluctuation (less than 0.1mm) in the direction of the optical axis of the lens 6, at the position of the unknown flow field. According to one example, the reference flow is formed by rotating a diffusely scattering disk. It must be possible to move the reference flow in the direction mentioned.

After focusing of the lenses 6 and 10 is completed, the point at which the laser light emerges from the light source 1, if the light beam exhibits its minimum spot radius at this point, is moved approximately to a distance $z_o$ corresponding to the effective focal length of the lens 6. While shifting the reference flow within the focusing range (of the order of magnitude 0.1 to 1mm) the frequency of the Doppler signal must not vary.

It is usually not possible to maintain the stated conditions precisely. Thus, especially for lenses having long focal lengths, the apparatus of FIG. 3 is used to produce a virtual variation or displacement. That is, the lens 15 and 16 are arranged between the beam splitter 3 and the laser light source 1. The distance $d_o$ is adjusted so that no frequency variation of the Doppler signal occurs as the reference flow shifts. As an aid, the position of the location of the minimum spot radius as a function of $d_o$ may be expressed in the form of a table or graph determined experimentally or mathematically. This greatly simplifies the adjustment procedure.

Figure 4:
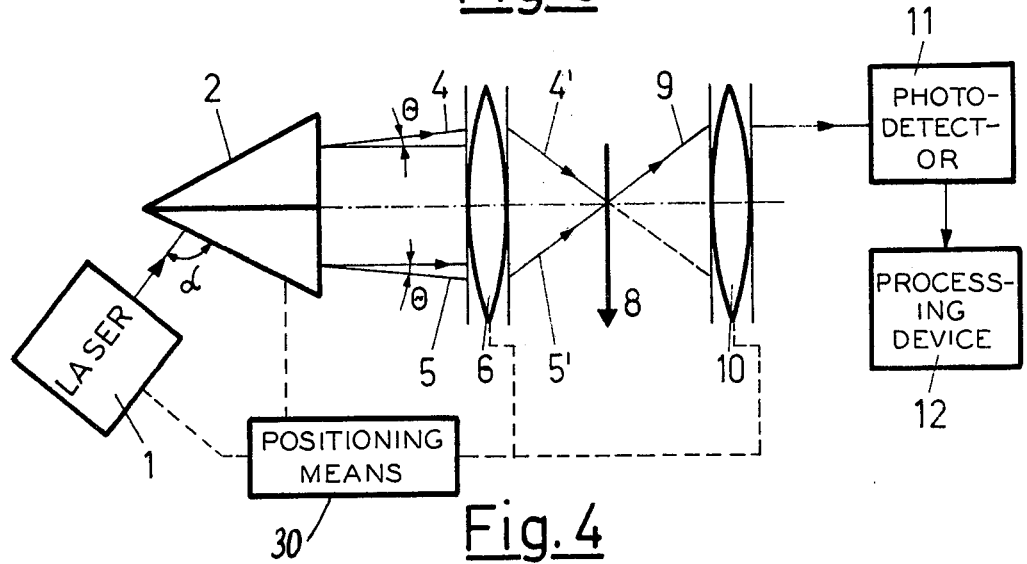
FIG. 4 is a schematic representation of an optical system suitable for practicing a method embodying the invention.

As mentioned above, according to another embodiment of the invention, the angle of incidence of the beams 4 and 5 striking the lens 6 is varied. A system performing this function is shown in FIG. 4. This structure differs from the structure of FIG. 1 in the apparatus to the left of the lens 6. Here in the illuminating system of the optical anemometer for speed measurements, the laser 1 produces a beam which strikes a so-called Koester prism 2. Such a Koester prism is a beam splitter which allows the variation of the angle of incidence of the beams 4 and 5 falling on the lens 6 to occur symmetrically. Koester prisms are described in the publication "ABC der Optic", published by Werner Dausien, Hanau, Main. In FIG. 4, variation of the angle of incidence $\alpha$ makes it possible to vary the angles of incidence $\iota$ symmetrical to the axis of symmetry of the prism, which coincides with the optical axis of the lens 6. The optimum angle of incidence is determined according to the following equation $$\tan \theta = \frac{y_o (\sqrt{l'^2 - y_o^2} - f_M)}{f_o \sqrt{l'^2 - y_o^2}} \quad (II)$$

In this equation $y_o$ is the distance of the incident beams 4 and 5 from the optical axis of the lens 6, $f_o$ is the focal length of the lens 6, and $f_M$ is the effective focal length of the lens 6 with respect to the beams 4 and 5. The value $l'$ can be derived from equation (I) if $l$ is made to equal $l'$.

The procedure for experimentally determining the optimum angle $\theta$ is similar to that of the aforementioned displacement method. Using a shiftable reference flow, the angle is varied until the displacement of the reference flow in the direction of the optical axis of the lens 6 no longer results in a frequency variation of the Doppler signal.

Naturally, displacement of the laser light source 1 relative to the lens 6, the virtual displacement discussed with respect to FIG. 3, and the angle variation of FIG. 4 can be combined.

Figure 5:
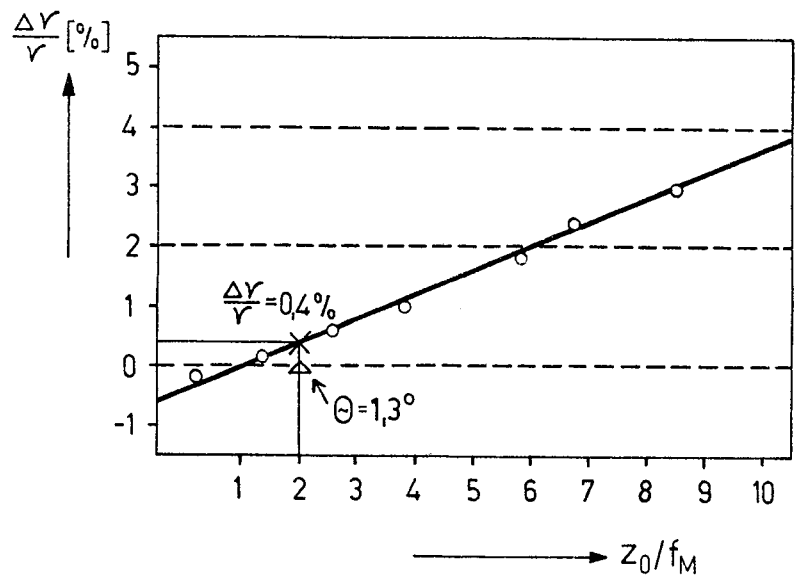
FIG. 5 is a graph illustrating the dependence of the measurement error on the optical parameters of the illuminating system.

FIG. 5 illustrates the change in relative measurement error $\Delta \nu/\nu$ with respect to the quotient of the distance $z_o$ and the effective focal length $f_M$. The relative measurement error is plotted in percent. This measurement error corresponds to a deviation of the object being measured in the direction of the optical axis of the lens 6, i.e., the fluctuation of the measured volume in this direction. Scattering particles moving through the peripheral zone of the measured volume furnish a Doppler signal which differs according to this error from those which move through the center of the measured volumes. This diagram is based on a measurement with an illumination system using a thin lens with $f_o = 284$ mm, $l = f_M = 285$ mm. The distance $y_o$ was 20mm. The angle $\theta$ was was 0°.

The diagram further illustrates the effect of the variation of the angle when the quotient $z_o/f_M$ differs from the value 1. Thus, it was possible to eliminate an error $\Delta \nu/\nu$ of 0.4 percent occurring at $z_o/f_M$ by varying the direction of incidence $\theta = 1.3°$.

Figure 2:
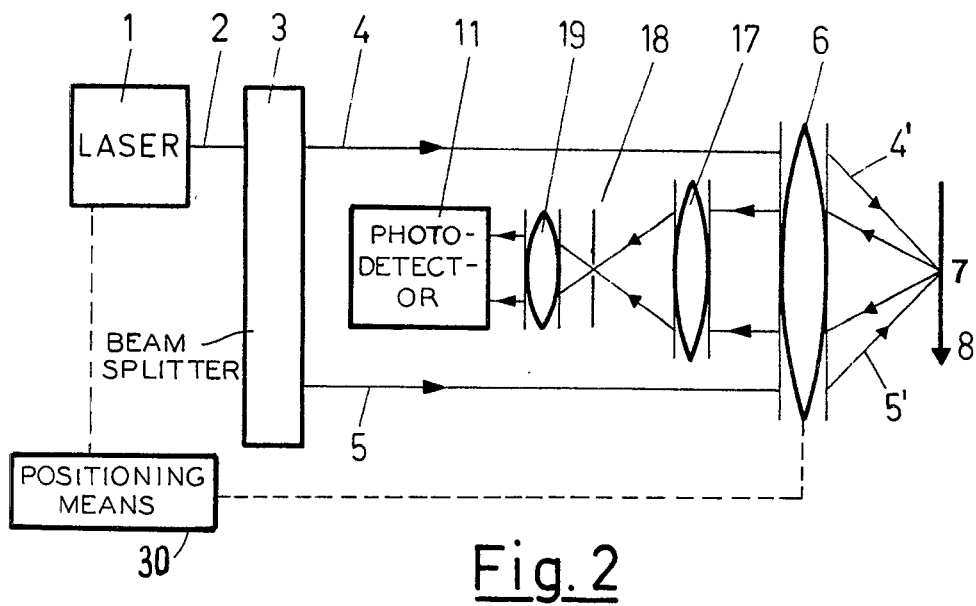
FIG. 2 is a schematic representation of an optical anemometer using an illumination system for reverse measurements.

The method of the invention is not limited to illumination systems corresponding to those of FIG. 1. FIG. 2 illustrates an illumination system that performs reverse measurements. Here, analogous to the system of FIG. 1, the systematic measurement error is eliminated by the method of the invention in any of its embodiments.

In FIG. 2, as in FIG. 1, the laser light source 1 directs the beam 2 and the beam splitter 3. The beam splitter 3, according to an embodiment of the invention, is a Koester prism. The two beams 4 and 5 leaving the beam splitter 3 are focused by the lens 6 onto the volume 7 to be measured. In FIG. 2, in contrast to FIG. 1, the reverse-scattered light, after passage through the lens 6, strikes another lens 17. The latter refocuses the resulting beams and passes them through a diaphragm 18 which masks them. A lens 19 focuses the masked beams into a photo-detector. Such an arrangement is often referred to as an interference or fringe system. It is particularly suitable for measuring the velocity of opaque objects.

Analogous to the expedients used with respect to the systems of FIGS. 1, 3, and 4 where the volume to be measured passes through the equipment, the measuring error of FIG. 2 can be eliminated by producing a real or virtual variation of the distance between the laser light source and the lens 6, and/or by producing a variation of the angle of incidence $\theta$. This involves shifting the position of the laser, utilizing the lenses 15 and 16 of FIG. 3, utilizing the prism 2 of FIG. 4, or combinations of these.

It is evident that the method of maximizing accuracy can be employed in other comparable illumination systems for optical anemometers. In particular, these methods can be used with the equipment described in the aforementioned journal "Laser und angewandte Strahlentechnick No. 3" and FIGS. 1 to 3. In optical anemometers of the type shown in the last mentioned journal, on page 16, FIG. 3, which use illumination systems where no lenses or mirrors focus on the volume to be measured, the measurement error can also be eliminated. For this purpose according to an embodiment of the invention, the location of the minimum spot radius is brought into coincidence with the measured volume by varying the distance between the laser light source and, in this case, the volume being measured. In such an illumination system, the two lenses 15 and 16 of FIG. 3 are provided between the laser light source 1 and the beam splitter 2. In the last mentioned journal the beam splitter is a semi-transmitting mirror. The virtual distance can then be varied by varying $d_o$ as described with respect to FIG. 3.

In FIGS. 1 to 4, suitable known positioning means 30 are used to hold and adjust the various elements relative to each other. These means control the distances between the elements or the angles of the elements relative to each other to obtain the desired location of the minimum spot radius.

The term "minimum spot radius" as used herein represents the portion of the light beam from a laser having the minimum radius. This minimum radius, which may be called a "focus" generally appears at the exit of the laser, although it may be shifted by various lenses or mirrors within the laser.

The term "moving volume" which is measured by the laser beam is used in the sense of a moving mass. It includes not only volumes or masses through which light may pass, but also opaque volumes or masses.

In FIG. 1, the beam 9 is composed of the beam 5' which passes through the measured volume, or mass of moving material such as a gas, and the light from beam 4' scattered by the volume or mass in the direction of the beam 5'. The beam 5' represents a reference beam. The background of the present invention is disclosed in an article by Durst and Whitelaw, entitled "Optimization of Optical Anemometers" in Proc. Roy. Soc. Lond. A, 324, 157–181 (1971).

A beamsplitter in the form of a Koester prism is disclosed in "Applied Optics" Vol. 3, No. 7, July 1964, 883–887, particularly on page 4.

Equation I may be derived from equation 42 in a publication by H. Kogelnik, T. Li, in "Applied Optics", Vol. 5, No. 10, Oct. 1966, 1550–1567.

The processing device 12 may, in the simplest case, be a spectrum analyser. The type shown in copending U.S. application Ser. No. 183,100 of Iten et al. may be used.

What is claimed is:

1. In an optical speed-measuring device, where two laser light beams are directed from at least one laser onto a measuring volume, and Doppler measuring means responds to the reflected light to determine the speed of the volume, and wherein the laser light beams emerging from the laser before being directed onto the measuring volume each exhibit a minimum spot radius, the method of adjusting the accuracy of the speed measurement, which comprises directing the beams onto the measuring volume and locating said minimum spot radii to conicide with the measuring volume.

2. The method as in claim 1, wherein the step of directing includes making each minimum spot radius conicide substantially with the center of the volume whose speed is to be measured.

3. The method as in claim 1, wherein the location of each minimum spot radius is made to coincide with the center of the volume whose speed is to be measured.

4. The method as in claim 2, further comprising focusing the light beams falling on the volume being measured.

5. The method as in claim 4, wherein a lens focuses the light beams and further comprising varying the distance between the source of the laser light beams and the lens.

6. The method as in claim 5, wherein each light beam falling on the measured volume is focused by said lens and varying the real distance between the source of each laser light beam and the lens.

7. The method as in claim 4, comprising varying the virtual distance between the laser light source and the measured volume.

8. The method as in claim 7, further comprising varying the virtual distance between the laser light source and the measured volume.

9. The method as in claim 8, wherein the pair of lenses includes a concave lens and a convex lens and the step of varying the virtual distance comprises the step of varying the distance between the concave and convex lenses.

10. The method as in claim 5, further comprising varying the virtual distance of the laser light source from the lens.

11. The method as in claim 10, wherein the distance between the location of each minimum spot radius and the lens is made approximately equal to the effective focal length of the lens.

12. The method as in claim 1, wherein each light beam falling on the measured volume is focused by a lens, and the distance of the location of the minimum spot radius of the beams falling on the lens from the lens is made substantially equal to the effective focal length of the lens for the beams.

13. The method as in claim 1, wherein each light beam falling on the measured volume is focused by a lens, and wherein the angle of incidence of the beams falling on the lens is varied so that the location of each minimum spot radius coincides with the volume whose speed is being measured.

14. The method as in claim 13, wherein each laser light beam passes through a Koester prism and the further comprising varying the angle of incidence relative to the Koester prism.

15. A method as in claim 14, wherein the angle of refraction of the beams leaving the Koester prism varies with the angle of incidence and the angle of refraction of both beams through the prism vary symmetrically to the optical axis of the lens.

16. The method as in claim 4, wherein the light beams falling on the measured volume are focused by a lens, the distance between the laser light source and the lens is varied to produce a variation in the real distance between the laser light source and the lens, a virtual variation of the distance between the laser light source and the lens is produced optically, and the angle of incidence of the beams falling on the lens is varied.

17. The method of optically measuring the speed of a material, which comprises directing two laser beams each having a minimum spot radius toward the material so that the material deflects a portion of one of the beams, forming a Doppler signal with the deflected portion and the other beam as an indication of the speed of the material, the step of directing the beams including positioning the minimum spot radii at the material.

18. The method as in claim 17, wherein the step of positioning includes positioning the source of the laser beams relative to the material.

19. The method as in claim 17, wherein the step of positioning includes optically focusing the beams with lenses.

20. The method as in claim 17, wherein the step of directing the laser beams includes focusing the laser beams with a lens, the step of positioning the minimum spot radii includes shifting the angle of the beams relative to the axis of the lens.

21. The method as in claim 17, wherein the step of positioning includes varying the virtual positions of the minimum spot radii by means of lenses.

22. The method as in claim 17, wherein the step of positioning includes varying the real positions of the minimum spot radii relative to the material.

23. The method as in claim 21, wherein the step of positioning the beam also includes varying the real positions of the minimum spot radii relative to the material.

24. The method as in claim 19, wherein the step of directing further includes varying the virtual position of the minimum spot radii.

* * * * *